(12) United States Patent
Grunert et al.

(10) Patent No.: US 7,091,693 B2
(45) Date of Patent: Aug. 15, 2006

(54) BATTERY WITH NON-VOLATILE MEMORY FOR LMR PORTABLE RADIO APPLICATIONS

(75) Inventors: David R. Grunert, Coleman Falls, VA (US); Shane Miller, Lynchburg, VA (US)

(73) Assignee: M/A-COM, Inc., Lowell, MA (US)

( * ) Notice: Subject to any disclaimer, the term of this patent is extended or adjusted under 35 U.S.C. 154(b) by 4 days.

(21) Appl. No.: 10/879,911

(22) Filed: Jun. 29, 2004

(65) Prior Publication Data

US 2005/0285571 A1    Dec. 29, 2005

(51) Int. Cl.
*H02J 7/00* (2006.01)
(52) U.S. Cl. ........................... 320/107; 320/132
(58) Field of Classification Search ................ 320/107, 320/122, 104, 119
See application file for complete search history.

(56) References Cited

U.S. PATENT DOCUMENTS

| 5,600,230 A | 2/1997 | Dunstan | |
|---|---|---|---|
| 6,741,065 B1 * | 5/2004 | Ishii et al. | ................... 320/122 |

* cited by examiner

*Primary Examiner*—Karl Easthom
*Assistant Examiner*—Samuel Berhanu

(57) ABSTRACT

An apparatus and method for monitoring and storing a status of a rechargeable battery pack in which the battery pack status is monitored by a device while the battery pack is functionally connected to that device, and then periodically updated to a non-volatile memory in the battery pack. The non-volatile memory may be connected in power isolation from the rechargeable cells, thereby ensuring that the battery is not drained during long periods of storage. The battery pack may also have a latch, which has to be released in order to remove the battery pack from any device to which it can be functionally connected. Releasing the latch may cause the battery status to be written to the non-volatile memory, ensuring that the battery's memory has up-to-date battery status information, whenever the battery is removed from the device regardless of any scheduled data writes.

18 Claims, 3 Drawing Sheets

BATTERY WITH NON-VOLATILE MEMORY FOR LMR PORTABLE RADIO APPLICATIONS

FIELD OF THE INVENTION

The present invention relates to rechargeable battery technology and, more particularly, to methods and apparatus for in-battery storage of information relating to battery charge and life-cycle status.

BACKGROUND OF THE INVENTION

Rechargable batteries are used extensively to power portable electronic devices such as portable or cellular phones and laptop computers. When using a device powered by a rechargeable battery, it is desirable to know how much usable charge remains in the battery. As the capacity of a rechargeable battery diminishes with each recharging cycle, accurately predicting the remaining charge requires knowing how many times the battery has been recharged. Nickel cadmium (NiCd), and to a lesser extent nickel metal hydride (NiMH), rechargeable batteries also suffer from "voltage depression", an affect in which the battery voltage drops unusually quickly if they are recharged before being fully discharged. For optimum recharging of NiCd and NiMH batteries, it is, therefore, desirable to know the life-time charge history of the battery, particularly the state of discharge it reached during use.

To meet these battery monitoring needs, a number of smart, rechargeable batteries have become available that incorporate memory and circuitry for calculating, storing and reporting a charge status and history of the battery. Such smart, rechargeable batteries are described in, for instance, U.S. Pat. No. 5,600,230 to Dunstan, entitled "Smart Battery Providing Progammable Remaining Capacity and Run-time Alarms Based on Battery Specific Characteristics", the contents of which are hereby incorporated by reference.

Certain Land Mobile Radio (LMR) portable radio applications, however, have battery monitoring requirements that go beyond what is provided by current smart rechargeable battery technology. For instance, emergency and rescue services require that any status storing and reporting technology added to rechargeable batteries used to power their LMR portable radios must have no detrimental effect on the battery. This means that the status storing technology must provide data retention for as long as five years, without drawing any power from the rechargeable battery during that time, under a wide range of environmental conditions. In addition, the status storage technology must allow for sudden and rapid removal from charging devices and equipment without loss of status data or any other significant information.

Attempting to meet these stringent requirements results in conflicting technology needs. For instance, the issue of avoiding data loss (or having unacceptably out of date data) when a battery pack is removed from a device may be avoided by reporting battery status to the memory on a regular, quasi-continuous, schedule (about once every 30 s). In a typical 9 hour battery recharge this would result in about 1000 memory erase/write cycles. The problem with this solution is that, to meet the low cost, long term storage requirements, the most suitable memory is an Electrically Erasable Progammable Read Only Memory (EEPROM) device, but EEPROMs have a finite number of erase/write cycles (typically 50,000) before they fail. (The erase function degrades an oxide barrier on the silicon and eventually leads to failure of the EEPROM). This finite number of erase/writes of the EEPROM would limit the total number of battery charge-discharge cycles to an unacceptably low 50 cycles, if the battery status was updated on a quasi-continuous schedule.

To meet the stringent battery monitoring requirements of industrial and professional users, what is needed is a method that allows EEPROM-like memories to be used for recording battery status in which the EEPROM data write cycle occurs at a relatively slow rate (once every 10 minutes or longer), yet is assured of having up to the second status data, even in the event of sudden and rapid removal of the battery from the status reporting device.

SUMMARY OF THE INVENTION

Briefly described, the invention relates to an apparatus and method for monitoring and storing a status of a rechargeable battery pack.

In a preferred embodiment, the status of a battery pack is monitored by a device while the battery pack is functionally connected to that device. For instance, when a battery pack is either powering a radio, or being charged on a charging unit, the radio, or the charging unit, monitors the status of the battery pack. The device then updates the status to a non-volatile memory in the battery pack. In a preferred embodiment, the non-volatile memory in the battery pack may be connected in power isolation from the battery pack's rechargeable cells, thereby ensuring that the battery is not drained during long periods of storage. All power for the non-volatile memory is, instead, supplied by the devices while the battery pack is functionally connected to them.

The battery pack may also have a latch, which has to be released in order to remove the battery pack from any device to which it can be functionally connected. In a preferred embodiment, the action of releasing the latch may cause a final battery status to be written to the non-volatile memory. Releasing the latch may, for instance, close a data-write switch, thereby triggering a data write just before the battery pack is removed from the device. In this way, the memory may be assured of having up-to-date battery status information, no matter when the removal occurs in relation to any scheduled data writes. This eliminates the need to schedule frequent data writes, thus minimizing power drainage, and considerably lengthening the time to failure of the non-volatile memory, which typically occurs after about 50,000 write cycles.

The status data stored on the non-volatile memory may include one or more battery status indicators such as, but not limited to, a running total of charge moved into said rechargeable cell, a running total of charge moved out of said rechargeable cell, a date, time and status of a last charge, a date, time and status of a last discharge and a total number of charge and discharge cycles, or some combination thereof.

These and other features of the invention will be more fully understood by references to the following drawings.

DETAILED DESCRIPTION

Figure 1:
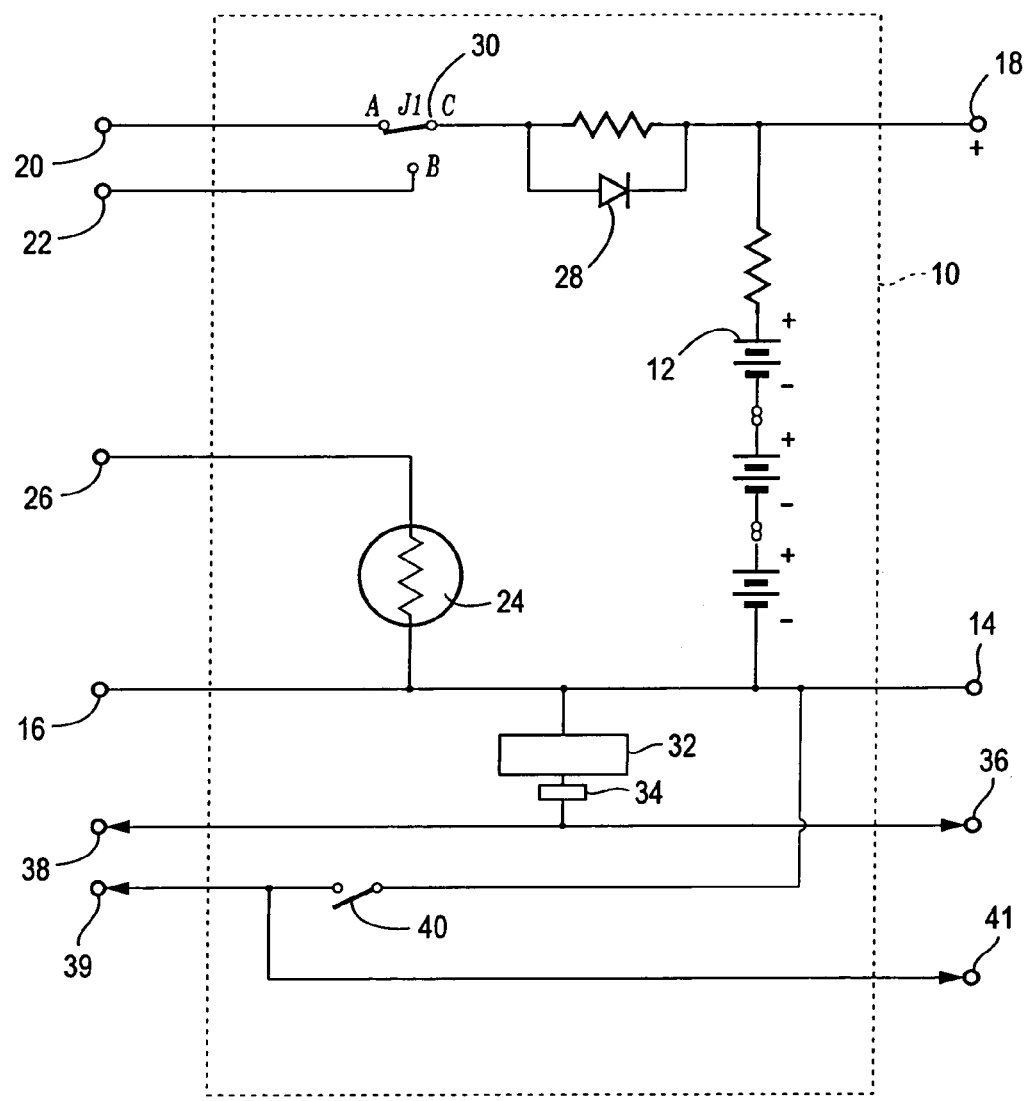
FIG. 1 is a schematic diagram of a rechargeable battery exemplifying inventive concepts of one embodiment of the present invention.

The present invention relates to systems and methods that monitor and record rechargeable battery status and history. In particular, the present invention relates to such systems and methods that meet the stringent demands of industrial and professional users such as, but not limited to, emergency and rescue services which use rechargeable batteries to power devices such as, but not limited to portable radios. Such users require that any technology added to the rechargeable batteries used in, for instance, their LMR portable radios, has no detrimental impact on the battery, even during prolonged storage of the battery packs for as long as five years. This means that the battery status technology must provide data retention for up to five years with out power and under all required environmental conditions.

Industrial and professional users also require that any status technology must not affect the battery pack performance or specifications. The technology must also be erasable, allow a minimum of 50,000 write cycles and must be small relative to the battery pack.

In a preferred embodiment of the present invention, these requirements are met by placing a non-volatile memory inside the pack, but having all memory access lines and power supply lines brought out of the pack, to a device that the battery pack either powers, such as a mobile radio, or receives power from, such as a charging unit. In this way, there are no connections, other than ground, between the added non-volitile memory and the battery pack's power cells. Additionally, a switch activated by the battery memory release mechanism initiates a memory write to ensure that a final status is always recorded before a battery pack is removed from a device.

In a preferred embodiment of the present invention, data stored in the battery pack non-volatile memory includes, but is not limited to, a running total of charge moved into the cell stack during charging, and a running total of charge move out of the cell stack during discharging; the date, time and status of the last charge; the date, time and status of the last discharge; and a tally of the total number of charge and discharge cycles the battery has experienced.

In a preferred embodiment of the present invention, these usage parameters are measured by circuitry contained in the radio, charger or other device using the battery. For instance, upon initially powering up the radio, or inserting the battery into a charger, the radio or charger will read the data from the battery pack memory. The radio or charger will then periodically update the information as usage or charging progresses. Upon radio power down or charge cycle termination, the latest, updated data set will be downloaded back into the battery memory. A switch activated by, for instance, the battery latch release, also triggers a download of the latest, updated data set, ensuring that no matter when the battery is removed from the radio or charger, it will contain updated information.

During operation of the radio, the battery status indicator may provide a user with an indication of remaining battery capacity, and, therefore, remaining talk-time.

During charging of the battery, the battery status indicator information can be used to establish the correct charge profile and rate for the battery type, age, discharge status and cycle life. The information can also be used to display charge status such as, but not limited to, percent complete or time to complete.

An exemplary embodiment of the present invention will now be described by reference to the accompanying drawings, in which like numbers indicate like elements.

FIG. 1 is a schematic diagram of a rechargeable battery exemplifying inventive concepts of one embodiment of the present invention. A battery pack 10 comprises at least one rechargeable cell 12, a radio side ground contact 14, a charger side ground contact 16, a radio side supply connection 18, a charger side power contact 20, a charger side alternate power contact 22, a thermistor 24, a charger side thermistor contact 26, a charge connection diode 28, a battery type selection switch 30, a non-volatile memory 32, a memory protection 34, a radio side data contact 36, a battery side data contact 38, a data-write switch 40 and a charger side write contact 39 and radio side write contact 41.

The rechargeable cells 12, may be any of the well known rechargeable cell types such as, but not limited to, nickel cadmium (NiCd), nickel metal hydride (NiMH) or lithium ion technology. The battery type selection switch 30 is preset to match the rechargeable cell type, so that the appropriate charger side power contact 20 or the charger side alternate power contact 22 can be used for recharging. The thermistor 24 may be used to monitor the temperature of the cell during charging. The diode 28 may be used to prevent too high a charging current from being supplied to the cells.

The non-volatile memory 32 may be any suitable non-volatile memory chip. An exemplary non-volatile memory suitable for implementing the inventive concepts of this invention is the DS2433 4 kb, one wire electronically erasable programmable read only memory (EEPROM) device supplied by Dallas Semiconductor, a wholly owned subsidiary of Maxim Integrated Products, Sunnyvale, Calif. The DS2433 memory requires only a single data lead and a ground return as both the power to read and write the data, and the serially transferred data are supplied via the data lead.

Data stored in a non-volatile memory 32, may include usage information useful in LMR radio applications and battery recharging such as, but not limited to, a running total of the charge moved into the cell stack during charging, a running total of charge moved out of the cell stack during discharging, a date and time of the last charge or discharge, a status of the last charge or discharge, the status including whether the charge or discharge was complete or incomplete, and whether the last charge contained an error. Other useful information that may be stored includes, but is not limited to, a tally of the total number of charge and discharge cycles the battery has experienced. The usage parameters may be measured by well known monitoring circuitry contained in the radio and charger.

Permanent data may also be stored in non-volatile memory such as, but not limited to, a battery pack type, including chemistry, voltage, capacity, special charge requirements, a date and place of manufacture, a part number, including revisions, an authentication code and a serial number.

Permanent data may, for instance, be programmed into a reserved area of the non-volatile memory 32 during manufacture, while usage data may be stored in areas designated for read/write access.

The protective circuit 34 prevents the non-volatile memory from being accidentally or deliberately erased by, for instance, supplying a sufficiently high voltage to either the charger side data contact 38 or the radio side data contact 36. The protective circuit 34 may be any suitable voltage or current limiting device, including, but not limited to, a fuse.

The data-write switch 40 may be any suitable electronic switch, biased so as to be open in normal operation, and connected so that when it is closed, a radio-side write contact 41 is grounded. In a preferred embodiment, grounding the radio-side write contact 41 or the charger-side write contact 39 initiates a download of the latest, updated data set. Connecting the data-write switch 40 such that it must be closed prior to the battery pack 10 being removed from a device, ensures that no matter when the battery is removed from the device, non-volatile memory 32 will contain updated information.

Figure 2A:
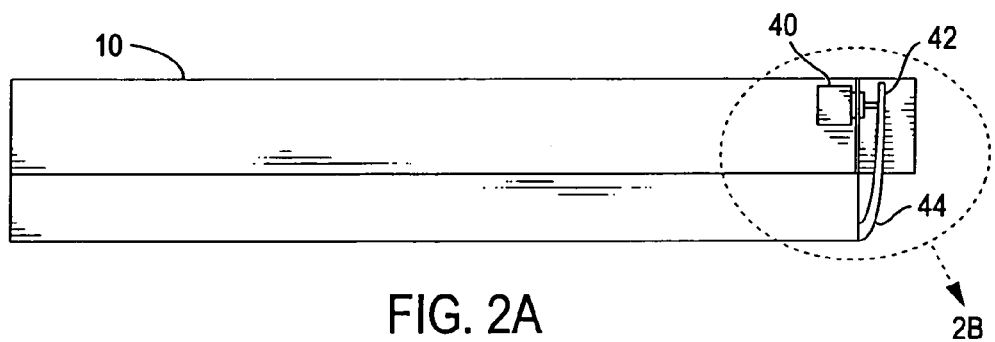
FIGS. 2 A & B are representations of a latch activate data-write switch exemplifying inventive concepts of one embodiment of the present invention.
Figure 2B:
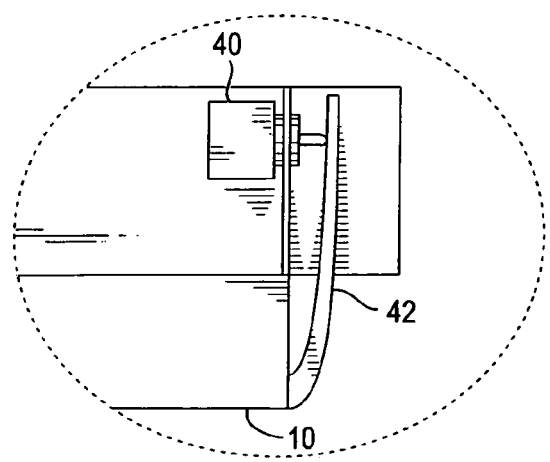

FIG. 2A is a representation of a latch activated, data-write switch exemplifying inventive concepts of one embodiment of the present invention. FIG. 2B shows the latch activated, data-write switch of FIG. 2A in more detail. The latch 42 is a sprung cantilever connected to the battery pack 10 by a hinged end 44. In a preferred embodiment, to remove the battery pack 10 from a device it is powering, it is necessary to first depress the latch 42. Depressing the latch 42 in turn closes the data-write switch 40, initiating a download of the latest, updated usage data to the non-volatile memory 32. In this way, the non-volatile memory is ensured of having updated usage data no matter when the battery pack is removed from the device.

Figure 3A:
FIGS. 3 A & B are representations of a locking latch activation of a data-write switch exemplifying inventive concepts of one embodiment of the present invention.
Figure 3B:
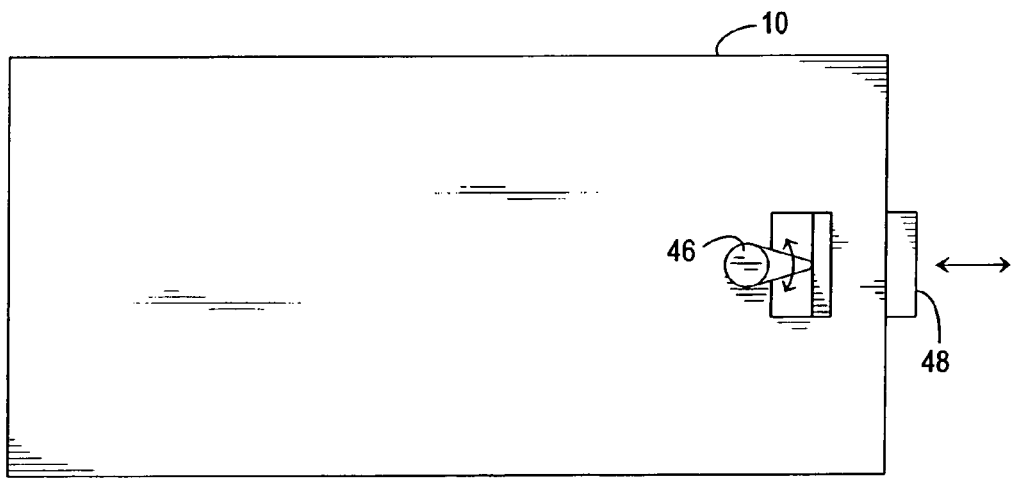

FIG. 3A is side elevation representation, and FIG. 3B is a plan representation of a locking latch activation for a data-write switch exemplifying inventive concepts of a further embodiment of the present invention. A latch 46 is rotatably connected to a data-write switch 40. When the latch 46 is in the position shown in FIG. 3B, latch catch 48 is slid forward from the battery pack 10, locking the battery pack 10 to a device it is powering. To detach the battery pack 10 from the device, the latch 46 must first be turned approximately 90 degrees, thus allowing latch catch 48 to slide toward battery pack 10. Turning the latch 46 by approximately 90 degrees places the switch 40 in a state that activates a download of the latest, updated usage data to non-volatile memory 32.

In a further embodiment of the invention, advantage may be taken of the peak capacity value in the charge accumulation register being "virtual", i.e., it may be assigned any value at any time. The charger may, for instance, perform a "condition and calibrate" function in which the battery pack may be conditioned by recycling two or three times. During the conditioning, the resultant battery pack capacity may be monitored, and this actual capacity stored as the peak capacity value in the charge accumulation register, thereby effectively re-calibrating the battery's "gas gauge".

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention

What is claimed is:

1. A rechargeable battery for use in providing power to an electrical device to which it can be electrically coupled, said battery comprising:
   a rechargeable battery cell;
   a non-volatile memory in power isolation from said cell; and
   a switch having a first, off position and a second, on position adapted such that said switch is placed in said second, on position when electrically uncoupling said battery from said electrical device, and wherein placing said switch in said second, on position causes a data write to said non-volatile memory of said battery just prior to said uncoupling.

2. The battery of claim 1 wherein said switch is adapted such that said switch must be placed in said second, on position in order to electrically uncouple said battery from said electrical device, and wherein placing said switch in said second on position when said battery is electrically coupled to said electrical device causes a signal to be sent to said electrical device which instructs it to write data to said non-volatile memory of said battery.

3. The battery of claim 2 wherein said switch is biased to normally be in said first, off position.

4. The battery of claim 3 wherein said electrical device is a device that is powered by said battery.

5. The battery of claim 4 wherein said battery is further adapted to be alternately electrically coupled to a charging device for charging said cell and wherein said switch is further adapted such that said switch must be placed in said second, on position in order to electrically uncouple said battery from said charging device.

6. The battery of claim 5 wherein said non-volatile memory is integral with said cell such that said cell and non-volatile memory can be removed from said electrical device as a unit.

7. The battery of claim 6 wherein said non-volatile memory is adapted to receive power from said electrical device.

8. An electrical apparatus adapted to be electrically powered by a removable battery comprising:
   a battery housing comprising a rechargeable battery cell and a non-volatile memory connected in power isolation from said cell;
   an electrical device adapted to be powered by said cell and to which said battery housing can be selectively electrically coupled and uncoupled;
   a switch, contained in said battery housing, having a first, off position and a second, on position, said switch is biased to normally be in said first, off position and adapted such that said switch is placed in said second, on position when electrically uncoupling said battery from said electrical device, and wherein said placing said switch in said second on position causes a data write to said non-volatile memory of said battery just prior to said uncoupling.

9. The apparatus of claim 8 wherein said switch is disposed on said battery housing.

10. The apparatus of claim 8 wherein said switch is disposed on said electrical device.

11. A method of providing power from a rechargeable battery to an electrical device, said method comprising the steps of:
   providing a rechargeable battery cell;
   providing a non-volatile memory connected in power isolation from said cell;
   providing a switch having a first, off position and a second, on position; and
   placing said switch in said second, on position when electrically uncoupling said battery from said electrical device, and wherein said placing said switch in said second, on position causes a data write to said non-volatile memory of said battery just prior to said uncoupling.

12. The method of claim 11 wherein said step of placing said switch in said second, on position when said battery is electrically coupled to said electrical device causes a signal to be sent to said electrical device which instructs it to write data to said non-volatile memory of said battery.

13. The method of claim 12 further comprising the step of biasing said switch to normally be in said first, off position.

14. The method of claim 13 further comprising the step of powering said electrical device by said battery.

15. The method of claim 13 further comprising the steps of electrically coupling said battery to a charging device; and placing said switch in said second position in order to electrically uncouple said battery from said charging device.

16. The method of claim 15 further comprising the step of charging said battery while said battery is electrically coupled to said charging device.

17. The method of claim 11 further comprising integrally packing said non-volatile memory with said cell such that said cell and non-volatile memory can be removed from said electrical device as a unit.

18. The battery of claim 17 further comprising the step of powering said non-volatile memory from said electrical device.

\* \* \* \* \*